(12) United States Patent
Sammartino

(10) Patent No.: US 8,136,457 B2
(45) Date of Patent: Mar. 20, 2012

(54) SIDE BEARING FOR A RAILROAD CAR TRUCK

(75) Inventor: Giuseppe Sammartino, Mount Prospect, IL (US)

(73) Assignee: Wabtec Corporation, Wilmerding, PA (US)

( * ) Notice: Subject to any disclaimer, the term of this patent is extended or adjusted under 35 U.S.C. 154(b) by 210 days.

(21) Appl. No.: 12/540,815

(22) Filed: Aug. 13, 2009

(65) Prior Publication Data

US 2011/0038575 A1     Feb. 17, 2011

(51) Int. Cl.
*B61F 5/14*     (2006.01)

(52) U.S. Cl. .................... 105/199.3; 105/199.4; 384/423

(58) Field of Classification Search ............... 105/199.3, 105/199.4; 384/423
See application file for complete search history.

(56) References Cited

U.S. PATENT DOCUMENTS

| | | | |
|---|---|---|---|
| 2,571,190 A * | 10/1951 | Blattner | 384/225 |
| 2,913,288 A * | 11/1959 | Blattner | 384/423 |
| 4,130,066 A | 12/1978 | Mulcahy | |
| 4,712,487 A * | 12/1987 | Carlson | 105/199.3 |
| 5,601,031 A * | 2/1997 | Carlson | 105/199.3 |
| 5,806,435 A | 9/1998 | Pitchford | |
| 6,957,611 B2 | 10/2005 | O'Donnell et al. | |
| 7,044,061 B2 * | 5/2006 | O'Donnell et al. | 105/199.3 |
| 7,121,212 B2 | 10/2006 | Schorr et al. | |
| 7,325,499 B2 | 2/2008 | Jensen et al. | |
| 7,802,524 B1 * | 9/2010 | Gregar | 105/199.3 |
| 2002/0104459 A1 * | 8/2002 | Hewitt | 105/199.3 |
| 2008/0035012 A1 | 2/2008 | Monaco et al. | |

* cited by examiner

*Primary Examiner* — S. Joseph Morano
*Assistant Examiner* — Zachary Kuhfuss
(74) *Attorney, Agent, or Firm* — Cook Alex Ltd.

(57) ABSTRACT

A side bearing for use in a railroad car truck includes a cage, a resilient element within the cage, and a cap engaging an upper end of the resilient element. The cage has a bottom surface and an upturned sidewall, while the cap includes a top surface with a downturned sidewall. The downturned sidewall of the cap is at least partially received within the cage when the resilient element is in a partially compressed condition. The cap is fully received within the cage prior to the resilient element moving into a further compressed condition, such that the cage engages a car body wear plate to provide a solid stop that prevents further compression of the resilient element. One or both of the sidewalls includes wear-limiting contours that may include one or more raised pads.

17 Claims, 3 Drawing Sheets

SIDE BEARING FOR A RAILROAD CAR TRUCK

BACKGROUND OF THE DISCLOSURE

This disclosure generally relates to side bearings for controlling rocking dynamics, rolling dynamics, curving negotiation, and high speed stability of a railroad freight car.

A typical "three-piece" railroad car truck comprises two parallel side frames connected by a bolster laterally spanning the distance between the side frames. A car body sits atop the bolster with, among other things, one or more side bearings positioned between the bolster and the car body. The typical bolster-car body interconnection allows the car body to pivot about a bowl at the center of the bolster, with the side bearings frictionally engaging the underside of the car body and working to counteract the tendency of the car body to "hunt," oscillate, roll, or otherwise move in an uncontrolled manner with respect to the bolster.

A typical constant contact-type side bearing includes a base, one or more resilient elements, and a cap. The base retains the resilient elements on the bolster, while the cap overlays the resilient elements to engage a wear plate on the underside of the car body. The resilient elements bias the cap into constant engagement with the wear plate to prevent the car body from moving free of the resisting influence of the side bearing. A variety of different side bearings are known, including those described in U.S. Pat. No. 4,130,066 to Mulcahy; U.S. Pat. No. 5,806,435 to Pitchford; and U.S. Pat. No. 7,325,499 to Jensen et al., all of which are hereby incorporated herein by reference.

SUMMARY OF THE INVENTION

There are several aspects of the present subject matter which may be embodied in the devices and systems described and claimed below. These aspects may be employed alone or in combination with other aspects of the subject matter described herein.

In one aspect, a side bearing is provided for use in a railroad car truck. The side bearing comprises a cage, a resilient element, and a cap. The cage has a generally horizontal bottom surface and an upturned sidewall extending a substantially uniform vertical height from the bottom surface to a top land. Additionally, the upturned sidewall defines an interior of the cage. The resilient element is at least partially received within the interior of the cage. The cap engages an upper end of the resilient element. The cap includes a generally horizontal top surface and a downturned sidewall. The downturned sidewall is disposed around the perimeter of the top surface and extends substantially perpendicularly from the top surface. The resilient element is movable from an uncompressed condition to a partially compressed condition to a fully compressed condition. The downturned sidewall of the cap is adapted to be at least partially telescopically received within the interior of the cage, the downturned sidewall fitting directly adjacent to the upturned sidewall of the cage when the resilient element is in one of the compressed conditions. The cap is adapted to be fully received within the interior of the cage prior to the resilient element moving into the fully compressed condition.

In another aspect, a side bearing is provided for use in a railroad car truck. The side bearing comprises a cage, a resilient element, and a cap. The cage has a generally horizontal bottom surface and an upturned sidewall extending from the bottom surface to a top land, the upturned sidewall defining an interior of the cage. The resilient element is at least partially received within the interior of the cage. The cap engages an upper end of the resilient element and comprises a generally horizontal top surface having a perimeter and a downturned sidewall. Either the top land of the upturned sidewall of the cage includes an inwardly facing wear-limiting contour or the perimeter of the top surface of the cap includes an outwardly facing wear-limiting contour.

In yet another aspect, a side bearing is provided for use in a railroad car truck. The side bearing comprises a cage, a resilient element, and a cap. The cage has a generally horizontal bottom surface and an upturned sidewall which defines an interior of the cage and extends a substantially uniform vertical height from the bottom surface to a top land. The top land of the upturned sidewall of the cage has an inwardly facing wear-limiting contour. The resilient element is at least partially received within the interior of the cage. The cap engages an upper end of the resilient element and includes a generally horizontal top surface having a perimeter with an outwardly facing wear-limiting contour that is generally aligned with the inwardly facing wear-limiting contour associated with the top land of the upturned sidewall of the cage. The cap further includes a downturned sidewall which runs along the perimeter of the top surface and extends substantially perpendicularly to the top surface. The resilient element is movable from an uncompressed condition to a partially compressed condition to a further compressed condition. The downturned sidewall of the cap is adapted to be at least partially received within the interior of the cage directly adjacent to the upturned sidewall of the cage when the resilient element is compressed. The cap is adapted to be fully received within the interior of the cage prior to the resilient element moving into the fully compressed condition.

DESCRIPTION OF THE ILLUSTRATED EMBODIMENTS

Figure 1:
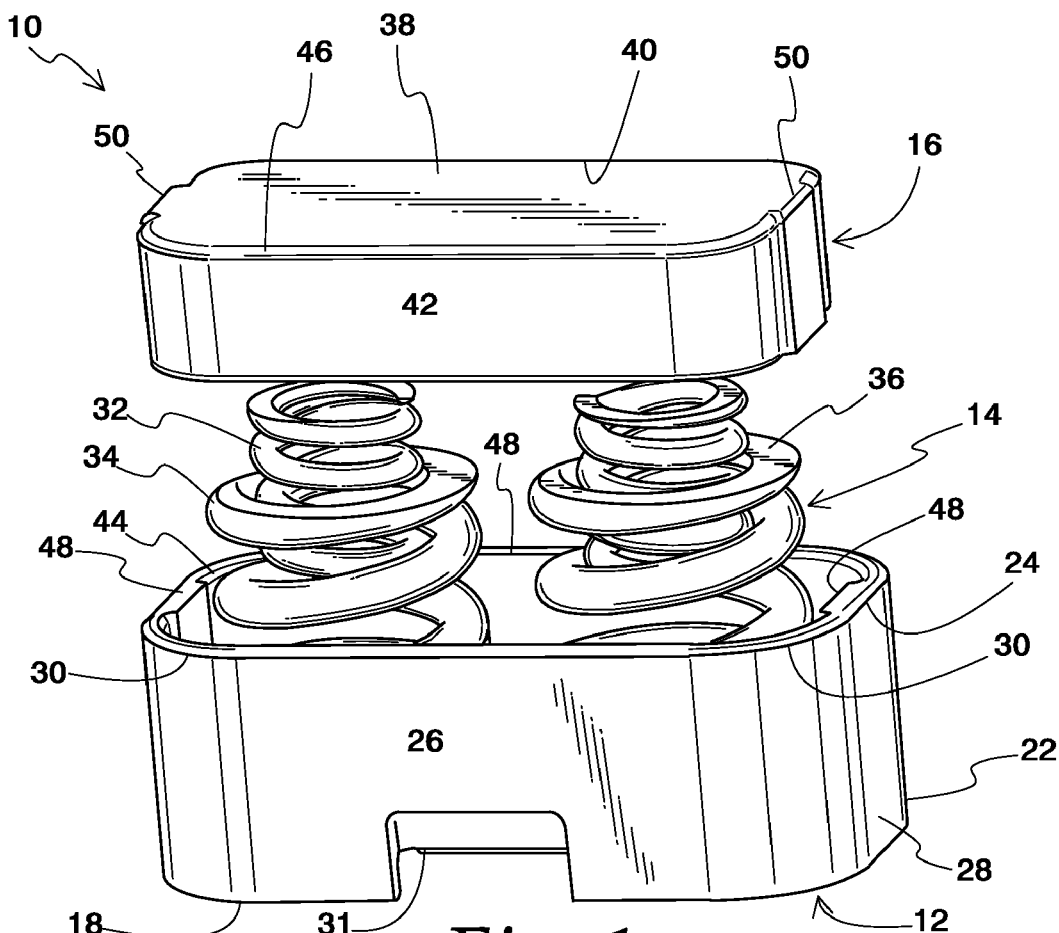
FIG. 1 is an exploded view of a side bearing according to the present disclosure.

The embodiments disclosed herein are for the purpose of providing the required description of the present subject matter. These embodiments are only exemplary, and may be embodied in various forms. Therefore, specific details disclosed herein are not to be interpreted as limiting the subject matter of this disclosure or the appended claims.

Side bearings according to the present disclosure may be employed with railroad car trucks according to known design. The elements of a typical railroad car truck (i.e., sideframes, a bolster, spring groups, friction wedges, etc.) and their relationships to each other are well known to those of skill in the art and will not be described in detail herein.

FIGS. 1-5 illustrate a first embodiment of a side bearing 10 according to the present disclosure. The side bearing 10 comprises a cage 12, one or more resilient elements 14, and a cap 16.

The cage 12 has a generally horizontal bottom surface 18 (FIGS. 2 and 4) suitable for being secured to the top of a truck bolster in a conventional manner. In other embodiments, the cage 12 may be otherwise secured to the bolster or integrally formed therewith.

An upturned sidewall 22 is disposed along the perimeter of the bottom surface 18, extending upwardly from the bottom surface 18 to a top land 24 and defining an interior of the cage 12. As will be described in greater detail herein, the resilient element 14 is at least partially received within the interior of the cage 12 and the cap 16 may also be at least partially received in the interior of the cage.

In the illustrated embodiment, the cage 12 is generally rectangular, having two opposing lateral sides 26 that are longer than two opposing ends 28, with the adjacent sides and edges being joined by curved corners 30. Drainage openings 31 (FIG. 2) may be provided near the bottom center of each side wall 26. However, the illustrated embodiment is merely exemplary and the shape of the cage may vary without departing from the scope of the present disclosure.

Positioned within the interior of the cage 12, and on top of its bottom surface 18, is at least one resilient element 14 (FIGS. 1-4). In the illustrated embodiment, the side bearing 10 is provided with a pair of identical resilient elements 14, although more or fewer resilient elements may be provided without departing from the scope of the present disclosure. Further, if a plurality of resilient elements are provided, they may be non-identical, although it may be advantageous for all of the resilient elements to be identical to provide the side bearing with improved balance and uniform cushioning.

Figure 2:
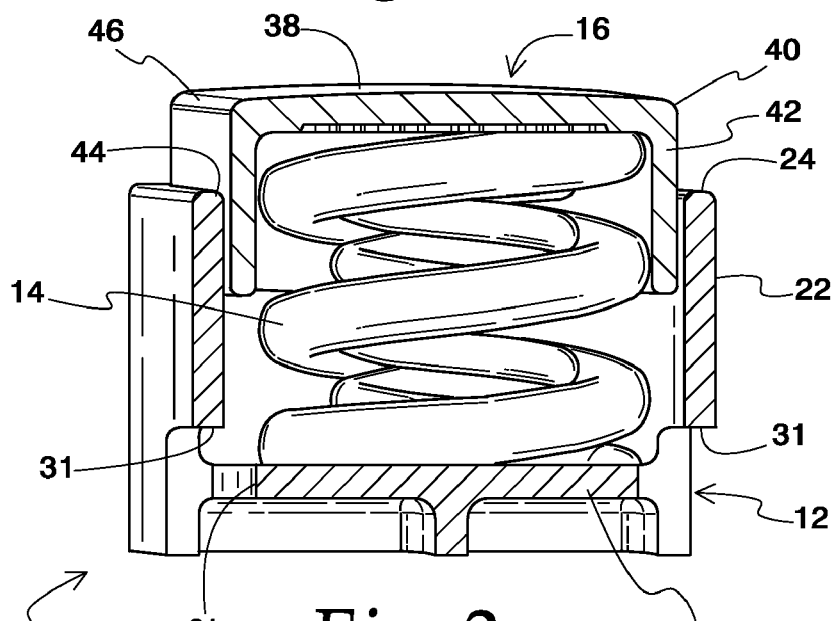
FIG. 2 is a perspective view of a transverse section of the side bearing of FIG. 1 at free height, with a resilient element thereof being in an uncompressed condition.
Figure 3:
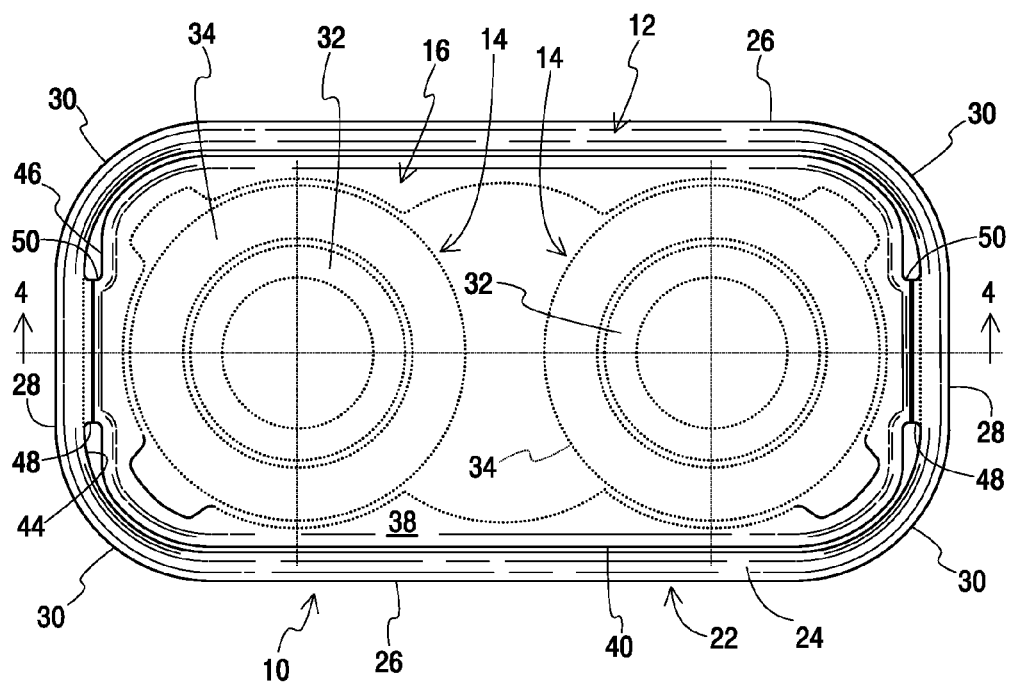
FIG. 3 is a top plan view of the side bearing of FIG. 1, with interior components shown in phantom lines.
Figure 4:
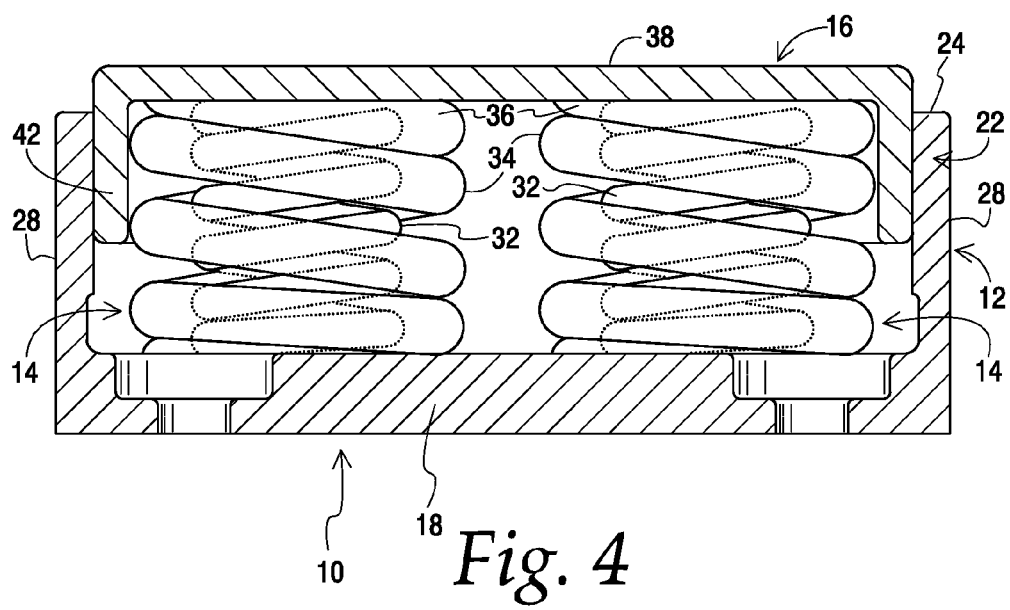
FIG. 4 is a section taken along line 4-4 of FIG. 3, with the top cap at set-up height in a partially compressed condition.

Each illustrated resilient element 14 comprises a pair of nested helical springs, with an inner spring 32 being received within the inner cavity of an outer spring 34. FIGS. 1 and 2 illustrate an inner spring 32 having a greater uncompressed height than the associated outer spring 34, but their uncompressed heights may alternatively be equal or the outer spring 34 may have a greater uncompressed height than the inner spring 32. The resilient element(s) may be variously provided without departing from the scope of the present disclosure. For example, each resilient element may be provided as a single helical spring or a pair of nested helical springs formed of a metallic material (such as steel) or a composite material. Additionally, an elastomeric resilient element or elements may also be provided. However, it may be advantageous to provide the resilient elements as illustrated in FIGS. 1-4 to increase the life and durability of each spring.

As will be described in greater detail herein, each resilient element 14 is movable from an uncompressed condition or free height (FIG. 2) to a partially compressed condition or set-up height (FIG. 4), to a further compressed condition (not shown) wherein the top surface 38 of the cap 16 is even with the top land 24 of the cage 12. A continuous range of partially compressed conditions are possible between the uncompressed condition or free height of FIG. 2 and the further compressed condition wherein the cap is pushed downwardly into the cage until the top surface of the cap is even with the top land of the cage.

Each resilient element 14 includes an upper end 36 that engages the cap 16. It may be advantageous for the upper end 36 of each resilient element 14 to be secured to the cap 16 to ensure proper positioning therebetween.

The cap 16 includes a generally horizontal top surface 38. The top surface 38 of the cap 16 defines a perimeter 40. A downturned sidewall 42 is disposed along the perimeter 40 and extends substantially vertically therefrom. The downturned sidewall 42 is at least partially telescopically received within the interior of the cage 12. It may be advantageous for the downturned sidewall 42 to be partially received within the interior of the cage 12 when the resilient element 14 is in an uncompressed condition to ensure that it will not engage the top land 24 of the upturned sidewall 22 in moving to a compressed condition, which could prevent proper operation of the side bearing 10.

The perimeter 40 of the cap 16, and hence the downturned sidewall 42, may be substantially congruent with the interior of the cage 12, such that the outer surface of the downturned sidewall 42 is positioned directly adjacent to the inner surface of the upturned sidewall 22 when the downturned sidewall 42 is at least partially received within the interior of the cage 12 (FIGS. 2-5). There may be a small gap or clearance between the upturned sidewall 22 and the downturned sidewall 42 to ensure that the cap 16 can move vertically with respect to the cage 12 without excessive contact therebetween, which would otherwise hamper performance of the side bearing 10. Such a configuration effectively encapsulates the cap 16 within the cage 12, maximizing the contact area when the cap 16 shifts in the longitudinal and/or lateral direction, which serves to reduce wear.

The top surface 38 of the cap 16 is intended to be in constant frictional engagement with a wear plate (not shown) on the underside of a car body to create resistance and increase car stability, according to known principles. To ensure that there is constant contact between the cap 16 and the wear plate, the side bearing 10 may be preloaded. This preload may be brought about during assembly of the car trucks to the car body or may be brought about by the use of shims, in manners well known to those of skill in the art. The side bearing 10 may provide a range of preloads at its set-up height, such as a range between approximately 1,000 and approximately 9,000 pounds. Other preloads or preload ranges may also be employed without departing from the scope of the present disclosure.

To prevent the resilient element 14 from "bottoming out" (i.e., fully compressing the coils of the spring), the upturned sidewall 22 of the cage 12 may provide a solid stop. In other words, the cap 16 may be adapted to be fully received within the interior of the cage 12 in a further compressed condition before the resilient element 14 becomes fully compressed. Such a configuration results in a solid stop because the wear plate on the underside of the car body is larger than the side bearing 10, so it will engage the top land 24 of the upturned sidewall 22 of the cage 12 as soon as the cap 16 has been fully received within the interior of the cage 12, which prevents further compression of the resilient element 14.

If the upturned sidewall 22 is configured to provide a solid stop, it may be advantageous for it to extend a substantially uniform vertical height from the bottom surface 18 to the top land 24, resulting in a substantially horizontal top land 24. If the upturned sidewall 22 is provided as a solid stop, a substantially horizontal top land 24 may be advantageous to provide a greater contact surface with the wear plate. Additionally, the upturned sidewall 22 may be substantially solid or unbroken (i.e., without apertures or openings) to further strengthen it if it is to provide a solid stop.

In use, the cage 12 of the side bearing 10 is secured to a rail car bolster, with the resilient element 14 in an uncompressed condition (FIG. 2) and the cap 16 secured to, or at least in engagement with, the upper end 36 of the resilient element 14. Typically, a second side bearing will be secured to another location on the bolster for optimum balance. A rail car body is then lowered onto the side bearings 10 so as to place a wear plate on the underside of the rail car body in engagement with the top surface 38 of the cap 16. So placing the rail car body upon the side bearing 10 will move the resilient element 14 from its uncompressed condition or free height to a partially compressed or set-up condition. The degree of compression initially experienced by the resilient element 14 will depend on a number of factors, including the aforementioned preloading, but it should not be so much as to cause the cap 16 to be fully received within the cage 12. On the contrary, the top surface 38 of the cap 16 should be initially positioned above the top land 24 of the upturned sidewall 22 of the cage 12 to allow the resilient element 14 to compress further in response to rocking or other movement of the rail car. In one embodiment, the top surface 38 of the cap 16 (when loaded with the car body) is approximately one quarter to three quarters of an inch above the top land 24 of the upturned sidewall 22 of the cage 12, allowing for a downward travel of approximately one quarter to three quarters of an inch from the initial set-up height before there is a solid stop.

Any relative movement of the rail car body with respect to the bolster will be resisted by the side bearing 10. For example, any downward vertical motion of the rail car body will be resisted by the resilient element 14, while any lateral or longitudinal movement of the car body will be resisted by the frictional engagement between the top surface 38 of the cap 16 and the wear plate on the underside of the car body. Such lateral or longitudinal movement of the car body may also cause corresponding movement of the cap 16, but by encapsulating the cap 16 within the cage 12, the contact area between the cap 16 and the cage 12 when the cap 16 shifts is maximized, thereby reducing wear.

According to another aspect of the present disclosure, the cage 12 and/or the cap 16 may be provided with a wear-limiting contour. FIGS. 1-5 illustrate the upturned sidewall 22 of the cage 12 with an inwardly facing wear-limiting contour 44 and the perimeter 40 of the cap 16 with an outwardly facing wear-limiting contour 46. When used herein, the terms "inwardly" and "outward" refer to the center of the side bearing 10 as a point of reference, with the inwardly facing wear-limiting contour 44 directed toward the center of the side bearing 10 and the outwardly facing wear-limiting contour 46 directed away from the center of the side bearing 10.

Figure 5:
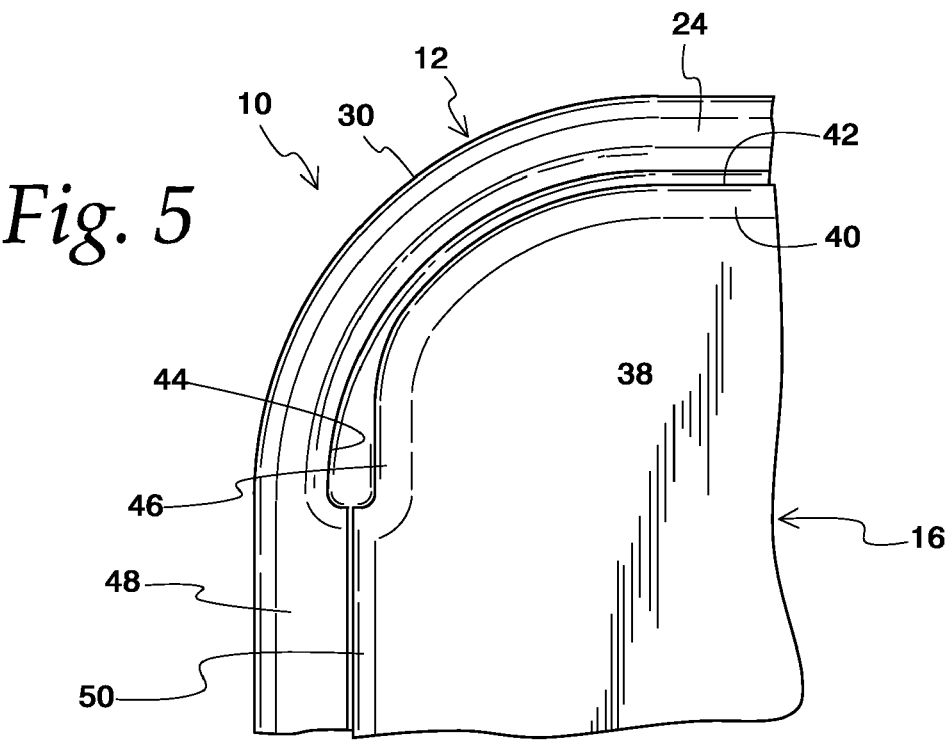
FIG. 5 is an enlarged, top plan view showing a detail of a top corner of the side bearing of FIG. 1.

As best seen in FIG. 5, the wear-limiting contours 44 and 46 are arranged to produce a space or gap between the sidewall 22 and the sidewall 42 of the cage and cap, respectively, at least in the corners 30 of the cage. This spacing is maintained by pairs of facing raised pads. At least one inwardly facing raised pad 48, one of which is shown in greater detail in FIG. 5, is formed on each end wall 28 of the cage. The top of each raised pad 48 is substantially horizontal and flush with the top land 24. The outwardly facing wear-limiting contour 46 includes at least one outwardly facing raised pad 50. Each raised pad 50 is substantially horizontal and flush with the top of the cap 16. The raised pads 50 associated with the wear-limiting contour 46 of the cap 16 are generally aligned with the raised pads 48 associated with the short ends 28 of the cage 12.

One function of the wear-limiting contours 44 and 46 is to remove the sharp edges of the cage 12 and the cap 16 that could otherwise bear against the other component during use of the side bearing 10. Providing a contoured edge rather than a sharp edge reduces the amount of wear in the event that, for example, the cap 16 becomes canted within the interior of the cage 12 and the edge of the cap 16 presses against the upturned sidewall 22 of the cage 12. With regard to the raised pads 48 and 50, they may be provided to ease manufacture of the side bearings 10 in that a milling operation can be utilized rather than a more complex computer numerical control (CNC) operation.

Figure 6:
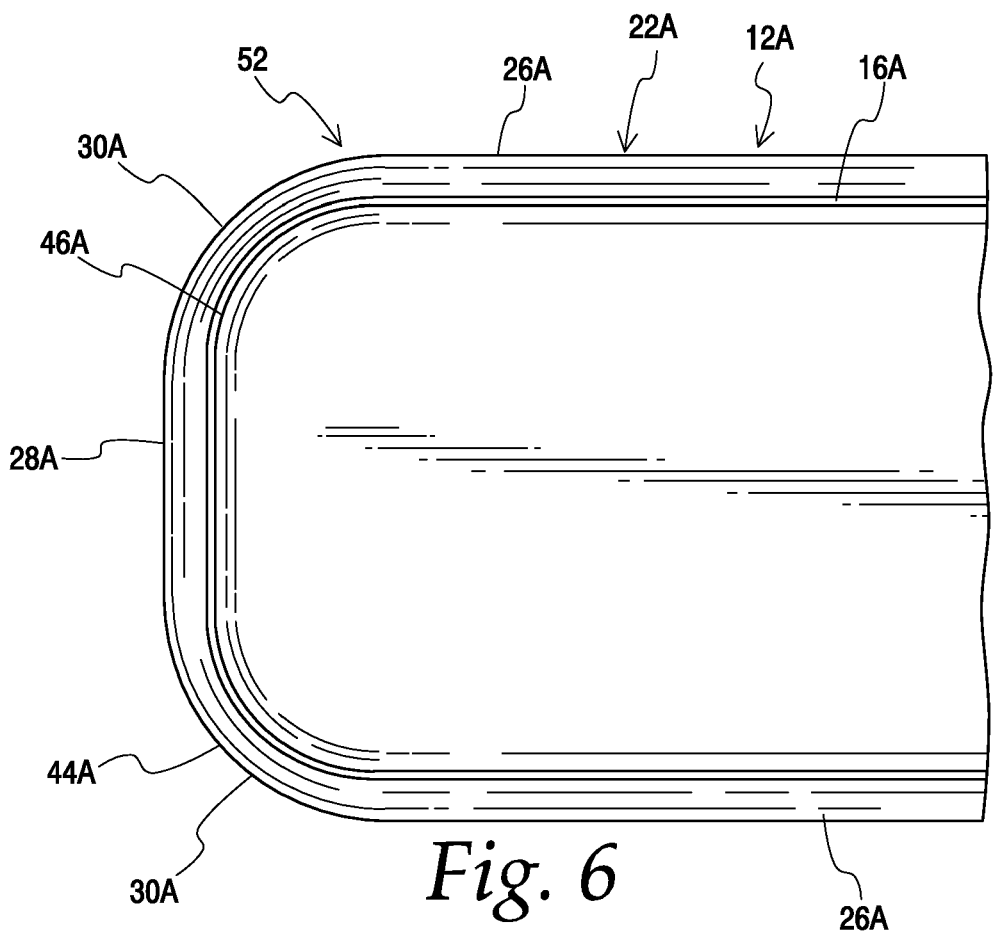
FIG. 6 is a top plan view of an alternate embodiment of a side bearing.

FIG. 6 illustrates an alternate embodiment of the side bearing 52. This embodiment is similar to that of FIGS. 1-5 in all respects except that the facing, wear-limiting contours 44A and 46A are formed without the raised pads. Bearing 52 includes a cage 12A having an upturned sidewall 22A having sidewalls 26A and end walls 28A, with the adjacent sides and edges being joined by curved corners 30A. A cap 16A fits inside the cage as described in the embodiment of FIGS. 1-5. The cap 16A has an outwardly facing wear-limiting contour 46A that is the same as in the previous embodiment except the raised pad 50 is removed. Similarly, the upturned sidewall 22A has an inwardly-facing contour 44A that is the same as in the previous embodiment except the raised pad 48 is removed.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims.

The invention claimed is:

1. A side bearing for use in a railroad car truck, comprising:
    a cage comprising a generally horizontal bottom surface and an upturned sidewall extending from the bottom surface to a top land, the upturned sidewall including two opposing lateral sides and two opposing ends with adjacent sides and ends being joined by corners, the upturned sidewall further including an inwardly facing wear-limiting contour and defining an interior of the cage;
    a resilient element at least partially received within the interior of the cage; and
    a cap engaging an upper end of the resilient element, the cap including a generally horizontal top surface having a perimeter and a downturned sidewall disposed around the perimeter of the top surface, the downturned sidewall of the cap including an outwardly facing wear-limiting contour interrupted by at least one outwardly facing raised pad and being adapted to be at least partially received within the interior of the cage directly adjacent to the upturned sidewall of the cage, the wear-limiting contour being arranged to produce a gap between the upturned sidewall and the downturned sidewall in the corners.

2. The side bearing of claim 1 wherein the resilient element comprises at least one pair of nested springs.

3. The side bearing of claim 1, wherein the inwardly facing wear-limiting contour is interrupted by at least one inwardly facing raised pad.

4. The side bearing of claim 1, wherein the inwardly facing wear-limiting contour is interrupted by two equally spaced, inwardly facing raised pads.

5. The side bearing of claim 1, wherein the outwardly facing wear-limiting contour is interrupted by two oppositely spaced, outwardly facing raised pads.

6. A side bearing for use in a railroad car truck, comprising:
    a cage comprising a generally horizontal bottom surface and an upturned sidewall extending from the bottom surface to a top land, the upturned sidewall including an inwardly facing wear-limiting contour having at least one inwardly facing raised pad and defining an interior of the cage;
    a resilient element at least partially received within the interior of the cage; and a cap engaging an upper end of the resilient element, the cap including a generally horizontal top surface having a perimeter and a downturned sidewall disposed around the perimeter of the top surface and including an outwardly facing wear-limiting contour having at least one outwardly facing raised pad, the downturned sidewall of the cap being adapted to be at least partially received within the interior of the cage directly adjacent to the upturned sidewall of the cage.

7. The side bearing of claim 6, wherein the raised pad associated on the upturned sidewall of the cage is aligned with the raised pad on the downturned sidewall of the cap.

8. The side bearing of claim 6, wherein the inwardly facing wear-limiting contour has two oppositely spaced, inwardly facing raised pads and the outwardly facing wear-limiting contour has two oppositely spaced, outwardly facing raised pads.

9. The side bearing of claim 8, wherein at least one of the raised pads on the inwardly facing wear-limiting contour of the cage is aligned with one of the raised pads on the outwardly facing wear-limiting contour of the cap.

10. The side bearing of claim 6, wherein each wear-limiting contour is interrupted by a plurality of raised pads.

11. The side bearing of claim 10, wherein at least two of the raised pads associated with the wear-limiting contour of the upturned sidewall of the cage are aligned with at least two of the raised pads associated with the wear-limiting contour of the downturned sidewall of the cap.

12. A side bearing for use in a railroad car truck, comprising:
a cage comprising a generally horizontal bottom surface and an upturned sidewall extending from the bottom surface to a top land, the upturned sidewall defining an interior of the cage;
a resilient element at least partially received within the interior of the cage; and
a cap engaging an upper end of the resilient element and comprising a generally horizontal top surface having a perimeter and a downturned sidewall which is substantially congruent with and directly adjacent to the upturned sidewall of the cage, wherein the upturned sidewall of the cage includes an inwardly facing wear-limiting contour which extends to the top land and the downturned sidewall of the cap includes an outwardly facing wear-limiting contour.

13. The side bearing of claim 12, wherein each wear-limiting contour includes at least one raised pad.

14. The side bearing of claim 13, wherein raised pads of the wear-limiting contours are aligned with one another.

15. A side bearing for use in a railroad car truck, comprising:
a cage comprising a generally horizontal bottom surface and an upturned sidewall extending from the bottom surface to a top land, the upturned sidewall defining an interior of the cage;
a resilient element at least partially received within the interior of the cage; and
a cap engaging an upper end of the resilient element and comprising a generally horizontal top surface having a perimeter and a downturned sidewall, wherein the upturned sidewall of the cage includes an inwardly facing wear-limiting contour, the downturned sidewall of the cap includes an outwardly facing wear-limiting contour, and each wear-limiting contour includes a plurality of equally spaced raised pads.

16. The side bearing of claim 15, wherein at least two of the raised pads associated with the wear-limiting contour of the upturned sidewall of the cage are generally aligned with at least two of the raised pads associated with the wear-limiting contour of the perimeter of the downturned sidewall of the cap.

17. A side bearing for use in a railroad car truck, comprising:
a cage comprising a generally horizontal bottom surface and an upturned sidewall extending a substantially uniform vertical height from the bottom surface to a top land, the upturned sidewall including an inwardly facing wear-limiting contour and defining an interior of the cage;
a resilient element at least partially received within the interior of the cage; and
a cap engaging an upper end of the resilient element, wherein
the cap includes a generally horizontal top surface having a perimeter and a downturned sidewall including an outwardly facing wear-limiting contour, the downturned sidewall being disposed on the perimeter of the top surface and extending substantially vertically from the perimeter,
the resilient element is movable from an uncompressed condition to a partially compressed condition to a further compressed condition, the downturned sidewall of the cap being adapted to be at least partially received within the interior of the cage directly adjacent to the upturned sidewall of the cage when the resilient element is in the further compressed condition,
the wear-limiting contours are generally aligned with each other, and
each wear-limiting contour includes a plurality of equally spaced raised pads and at least two of the raised pads associated with the wear-limiting contour of the upturned sidewall of the cage are generally aligned with at least two of the raised pads associated with the wear-limiting contour of the downturned sidewall of the cap.

* * * * *